FIG. I

INVENTOR.
WALDO J. FRIERDICH
BY Alfred W. Petchaft
ATTORNEY

INVENTOR.
WALDO J. FRIERDICH

BY *Alfred W. Petchoft*

ATTORNEY

INVENTOR.
WALDO J. FRIERDICH
BY
ATTORNEY

INVENTOR.
WALDO J. FRIERDICH
BY
ATTORNEY

United States Patent Office 3,316,479
Patented Apr. 25, 1967

3,316,479
REGULATING SYSTEMS FOR ALTERNATING CURRENT GENERATORS
Waldo J. Frierdich, Highland, Ill., assignor to Basler Electric Company, Highland, Ill., a corporation of Illinois
Filed Jan. 5, 1966, Ser. No. 530,752
16 Claims. (Cl. 322—25)

This application is a continuation-in-part of my copending application Ser. No. 217,991, filed Aug. 20, 1962 (now abandoned).

This invention relates in general to certain new and useful improvements in regulating systems for alternating current generators and, more particularly, to an improved type of alternator regulator.

When high A.C. voltages are required, it has become a common practice to employ A.C. generators where the field winding is part of the rotor and the armature is part of the stator. This device is often referred to in the industry as an "alternator." By use of this construction, the alternating current may be generated at very high voltages, because it is not necessary to connect the armature through movable contacts to a source of current as would be the case if the armature were revolving. The field winding of the alternator requires a source of direct current which can be supplied by a rotary exciter, such as, for example, a direct current generator. The field of the rotary exciter, in turn, may be supplied with power from the output of the alternator in which case a regulator is interposed between the field of the rotary exciter and the output of the alternator in order to regulate the output voltage of the alternator.

This system of regulation will suffice under many conditions in which alternators are used. However, if a heavy load current is drawn from the alternator, such as in the case of starting a motor, energizing a lamp load or in the event of a short circuit or other overload conditions, a large voltage drop takes place in the windings of the alternator. Consequently, the regulator is not supplied with a sufficient voltage input to maintain a high current output. As a result thereof, the exciter field voltage drops, decreasing the field voltage of the alternator and, therefore, causing a collapse in the alternator output voltage and current.

It is, therefore, the primary object of the present invention to provide a regulating system for alternating current generators which is capable of maintaining an adequate supply of direct current to the field of the exciter regardless of the load on the output of the alternator.

It is another object of the present invention to provide a regulating system for alternating current generators which maintains an adequate field voltage supply to the alternating current generator at all times during its operation.

With the above and other objects in view, my invention resides in the novel features of form, construction, arrangement and combination of parts presently described and pointed out in the claims.

In the accompanying drawings (four sheets)—

Figure 1:
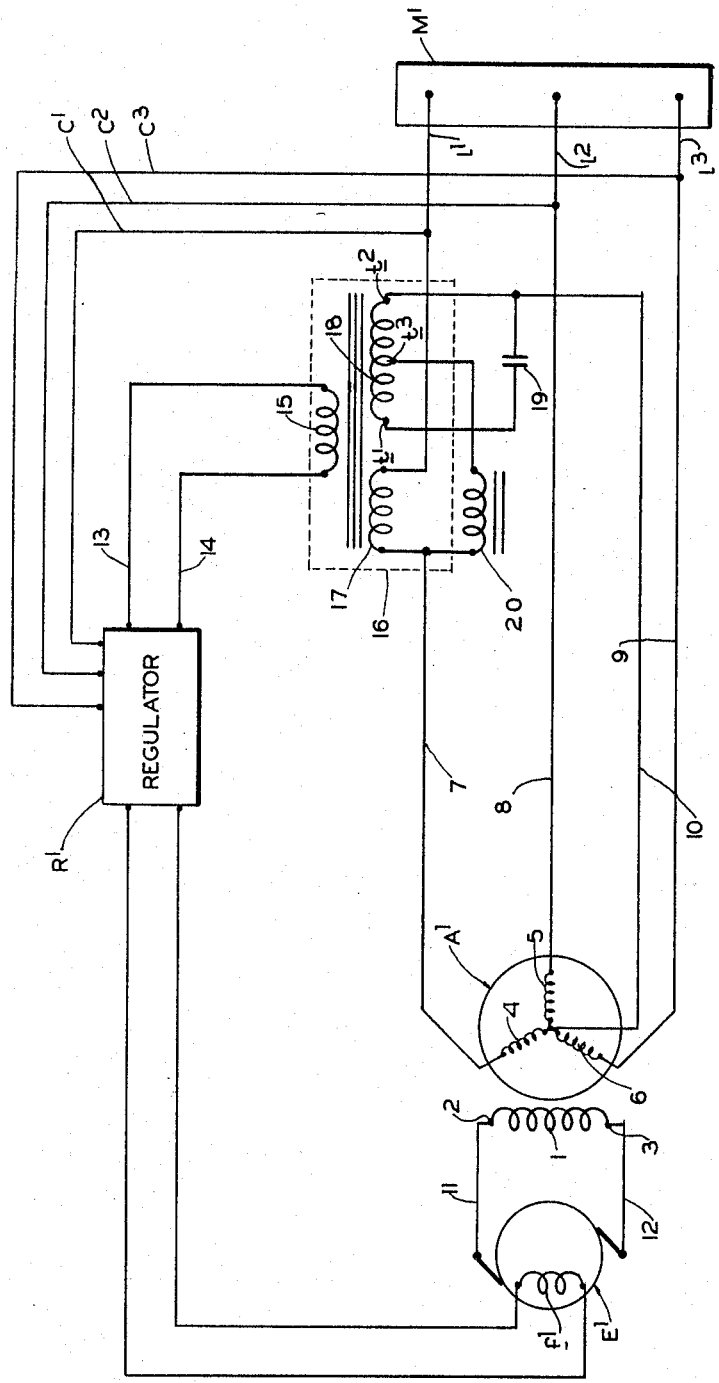
FIG. 1 is a schematic diagram of an A.C. generator regulating system constructed in accordance with and embodying the present invention.

Referring now in more detail and by reference characters to the drawings, which illustrate practical embodiments of the present invention, FIG. 1 illustrates a regulating system for an alternator $A^1$ which includes a rotating field winding 1 having terminals 2, 3. The alternator $A^1$ also includes three stator windings or coils 4, 5, 6, preferably connected in a Y configuration to output lines 7, 8, 9, and a neutral line 10. The Y connection is preferred by the industry over the "delta" connection, because of the usefulness of the neutral point and, therefore, the present invention is described in such configuration. It should be understood, however, that the regulating system of the present invention is equally well suited for use with delta connected alternators or with Y connected alternators which do not have an external neutral terminal. The operation and construction of the alternator $A^1$ is conventional and is, therefore, neither illustrated nor described in detail herein.

The field winding 1 is connected by lines 11, 12 to a brush or brushless type rotary exciter $E^1$ which supplies direct current thereto, and, in turn, has a field winding $f^1$ which is energized by a regulator $R^1$ having a conventional sensing circuit (not shown) which is connected by conductors $c^1$, $c^2$, $c^3$, to load lines $L^1$, $L^2$, $L^3$. The exciter $E^1$ and the regulator $R^1$ are conventional in construction and, therefore, neither illustrated nor described in detail herein.

The regulator $R^1$ receives alternating current through power transference means including a pair of conductors 13, 14, which are connected to output winding means constituted by the secondary or output winding 15 of a saturable transformer 16. Regulator $R^1$ rectifies such alternating current to provide a direct current supply to the field winding $f^1$ of the exciter $E^1$. The transformer 16 includes a primary or power input winding 17 which has a small number of turns and is in series between the line 7 and the load line $L^1$. Incidentally, the output lines 8, 9, are respectively connected directly to load lines $L^2$, $L^3$, and, electrically speaking, form continuous conductors therewith. The transformer 16 also includes an auxiliary primary or power input winding 18 having a large number of turns and being provided with end terminals $t^1$, $t^2$, and an intermediate tap $t^3$. The end terminal $t^2$ of the auxiliary primary 18 is connected to the neutral line 10 which is, of course, connected to the common neutral point of the windings 4, 5, 6. When using a three-terminal alternator having no neutral line, terminal $t^2$ can be connected to $L^2$ instead of the neutral line 10 with substantially equal performance. Connected across the end terminals $t^1$, $t^2$, of the auxiliary primary winding 18 is a capacitor 19 which improves the waveform and the voltage regulation of the output of transformer 16.

Connected at one terminal of the intermediate tap $t^3$ of the auxiliary primary winding 18 is a linear reactor 20 which is also connected at its other terminal to line 7, all as best seen in FIG. 1. The linear reactor 20 is provided to supply a lagging power factor current to the portion of the auxiliary primary between tap $t^3$ and end terminal $t^2$. This current must be large enough to produce partial magnetic saturation in transformer 16 and to supply to the exciter field winding via the regulator $R^1$ sufficient power to cause nominal output voltage from the alternator $A^1$ under the condition of no current in load lines $L^1$, $L^2$, and $L^3$.

In use, the load lines $L^1$, $L^2$, $L^3$, are connected to a load $M^1$ and the alternator $A^1$ is driven by a suitable prime mover such as a steam turbine or the like (not shown). The rotation of the field winding 1 will carry with it the lines of force which will pass across the windings 4, 5, 6, thereby including a voltage therein. The alternating current voltage which is produced in each of the windings 4, 5, 6, is conducted by the output lines 7, 8, 9, to the load lines $L^1$, $L^2$, $L^3$, and thence to the load $M^1$. When current flows through the primary winding 17, voltage will be induced in the auxiliary primary winding 18 and the secondary winding 15, thereby supplying supplementary energy to the regulator $R^1$.

Whenever the load $M^1$ suddenly increases, such as by the starting of a large electric motor, the voltages across the load lines $L^1$, $L^2$, $L^3$, suddenly drop. If, in such instance, the regulator $R^1$ were connected to two or more of the load lines $L^1$, $L^2$, $L^3$, as a source of its power, according to conventional practice, then such sudden and large decrease of voltage in the load lines $L^1$, $L^2$, $L^3$, would rather quickly be reflected in a corresponding reduction in the power output at the direct current side of the regulator $R^1$. However, with the control system of the present invention, as the load $M^1$ increases, the current within the load lines $L^1$, $L^2$, $L^3$, tends to increase. This, of course, tends to induce larger voltages within the windings 15, 17, and 18, of the saturable transformer 16, but, the latter will saturate, thereby controlling such voltages and holding them to relatively constant levels.

Consequently, when an increase in the load $M^1$ places a corresponding demand for increased current upon the alternator $A^1$, the latter will, in turn, require more power from the exciter $E^1$ which accordingly draws more power from the D.C. side of the regulator $R^1$. The regulator $R^1$ responsively draws more current at relatively constant voltage from the secondary winding 15 and the latter thus becomes a fully adequate and continuous source of power for the exciter $E^1$. In this connection, it should be noted that a load having a lagging power factor causes the alternator $A^1$ to place greater power demand on the exciter $E^1$ which, in turn, places greater power demand on the regulator $R^1$. However, a lagging power factor load current flowing in the primary winding 17 combines with the lagging current, which is always present in the reactor 20 and the portion of the auxiliary primary winding 18 between the intermediate tap $t^3$ and the end terminal $t^2$ to automatically produce maximum availability of power from the secondary winding 15.

Figure 2:
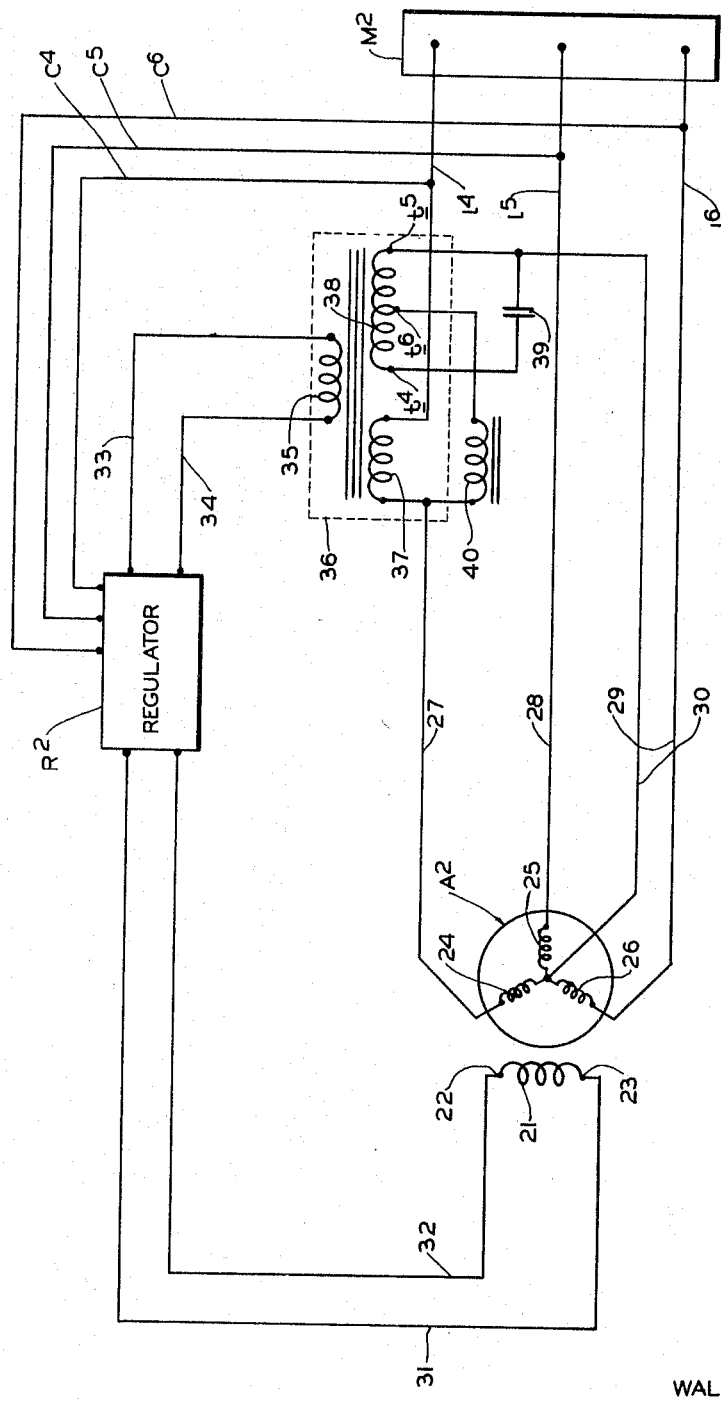
FIG. 2 is a schematic diagram of a first modified form of A.C. generator regulating system constructed in accordance with and embodying the present invention.

It is also possible to provide a modified form of regulating system for an alternator $A^2$ which, as shown in FIG. 2, is similar to the previously described regulating system shown in FIG. 1. The alternator $A^2$ includes a rotating field winding 21 having terminals 22, 23. The alternator $A^2$ also includes three stator windings or coils 24, 25, 26, also preferably connected in a Y formation, respectively, to output lines 27, 28, 29, and neutral line 30. The operation and construction of the alternator $A^2$ is conventional and is, therefore, neither illustrated nor described in detail herein.

The field winding 21 is connected by lines 31, 32, directly to a regulator $R^2$ which supplies direct current thereto. This regulator $R^2$ is substantially similar to the previously described regulator $R^1$ and includes a conventional sensing circuit (not shown) which is connected by coductors $c^4$, $c^5$, $c^6$, to load lines $L^4$, $L^5$, $L^6$. The regulator $R^2$ is substantially conventional in construction, and therefore, neither illustrated nor described in detail herein.

The regulator $R^2$ receives alternating current through a pair of conductors 33, 34, which are, in turn, connected to the secondary winding 35 of a saturable transformer 36, and rectifies such alternating current to provide a direct current supply to the field winding 21 of the alternator $A^2$. The transformer 36 includes a first primary winding 37 which has a small number of turns and is in series between the line 27 and the load line $L^4$. Incidentally, the lines 28, 29, are connected directly to load lines $L^5$, $L^6$. The transformer 36 also includes an auxiliary primary winding 38 having a large number of turns and being provided with end terminasl $t^4$, $t^5$ and an intermediate tap $t^6$. The end terminals $t^5$ of the auxiliary primary winding 38 is connected to the neutral line 30 which is, of course, connected to the common neutral point of the stator windings 24, 25, 26. Connected across the end terminals $t^4$, $t^5$ of the auxilary primary winding 38 is a capacitor 39 which improves the wave-form and the voltage regulation of the output of the transformer 36. A linear reactor 40 has one terminal connected to the intermediate tap $t^6$ on the auxiliary primary winding 38 and has its other terminal connected to line 27, all as best seen in FIG. 2. The linear reactor 40 is provided to supply a lagging power factor current to the portion of the second primary between the tap $t^6$ and end terminal $t^5$. This current must be large enough to produce partial magnetic saturation in the transformer 36 and to supply to the alternator field winding 21, via the regulator $R^2$, sufficient power to cause nominal output voltage from the alternator $A^2$ under the condition of no current in the load lines $L^4$, $L^5$, and $L^6$.

In use, the load lines $L^4$, $L^5$ $L^6$, are connected to a load $M^2$ and the alternator $A^2$ is driven by a suitable prime mover, such as steam turbine or the like (not shown). The rotation of the field winding 21 will carry with it the lines of force which will pass across the armature coils 24, 25, 26, thereby inducing a voltage therein. The alternating current voltage which is produced in each of the coils 24, 25, 26, is conducted by the output lines 27, 28, 29, to the load lines $L^4$, $L^5$, $L^6$, and thence to the load $M^2$. As previously described, in connection with the regulating system shown in FIG. 1, when current flows through the primary winding 37, voltage will be induced in the auxiliary primary winding 38, and the secondary winding 35, thereby supplying supplementary energy to the regulator $R^2$.

When the load $M^2$ suddenly increases, such as by the starting of a large electric motor, the voltages across the load lines $L^4$, $L^5$, $L^6$, suddenly drop. If, in such instance, the regulator $R^2$ were connected to two or more of the load lines $L^4$, $L^5$, $L^6$, as a source of its power, according to conventional practice, then such sudden and large decrease of voltage in the load lines $L^4$, $L^5$, $L^6$, would rather quickly be reflected in a corresponding reduction in the power output at the direct current side of the regulator $R^2$. However, with the control system of the present invention, as the load $M^2$ increases, the current within the load lines $L^4$, $L^5$, $L^6$, would increase. This, of course, would tend to induce larger voltages within the windings 35, 37, 38 of the saturable transformer 36 but the latter will saturate, and thereby control such voltages and hold them to relatively constant levels. Thus, as the increased load $M^2$ places a corresponding demand for increased current upon the alternator $A^2$, the latter will, in turn, require more power from the D.C. side of the regulator $R^2$, which, in turn, responsively draws more current at relatively constant voltage from the secondary 35 and the latter thus becomes a fully adequate and continuous source of power for the field winding 21 of the alternator $A^2$. This regulating system as illustrated in FIG. 2 will have the same desirable characteristics with respect to a lagging power factor load as the previously described regulating system shown in FIG. 1.

Figure 3:
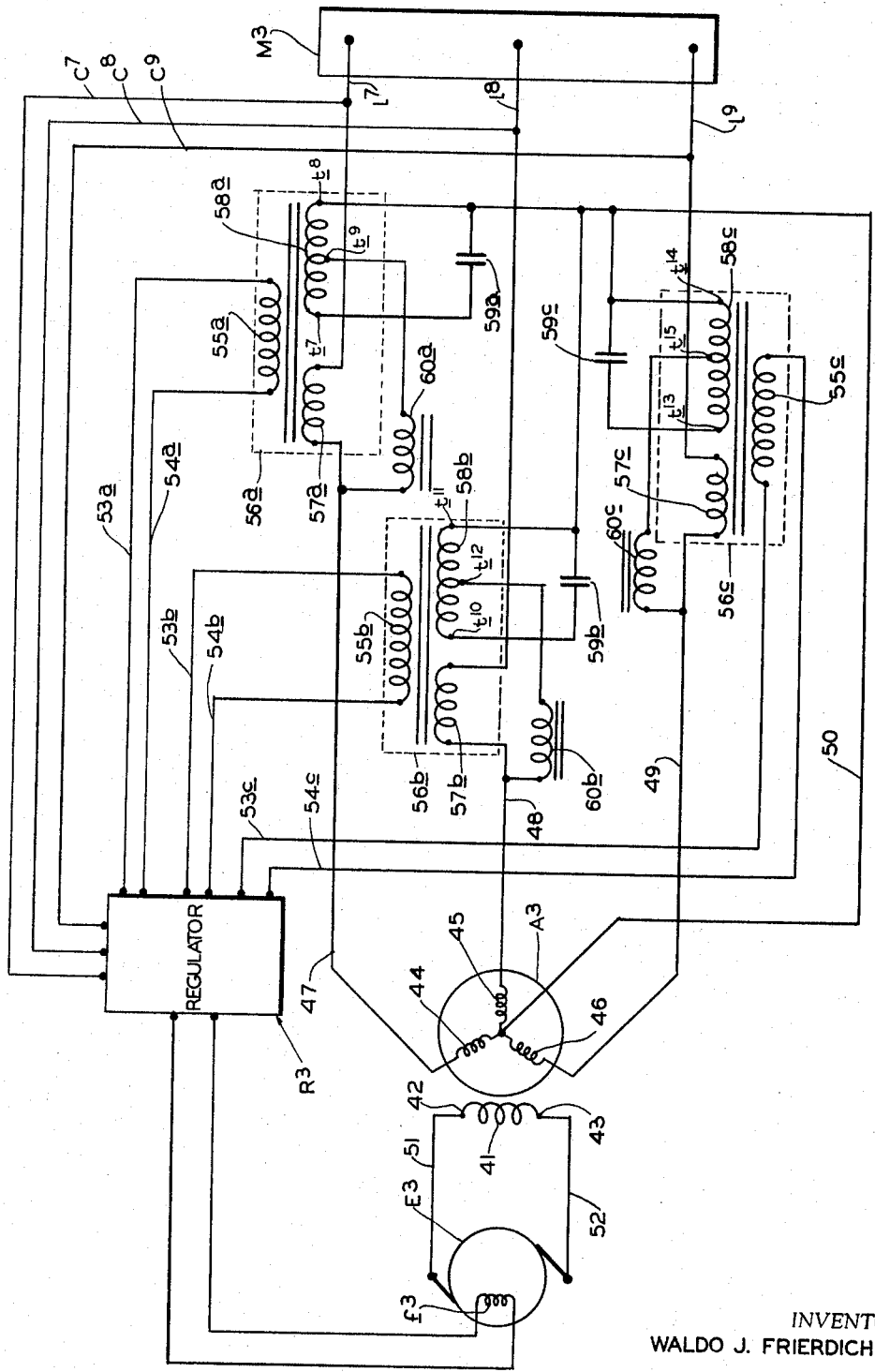
FIG. 3 is a schematic diagram of a second modified form of A.C. generator regulating system constructed in accordance with and embodying the present invention.

It is possible to provide a third form of regulating system as shown in FIG. 3, which is somewhat similar to the regulating system shown in FIG. 1 and is adapted for use with a conventional three-phase Y-connected alternator $A^3$ having a rotating field winding 41 having terminals 42, 43. The alternator $A^3$ also includes three stator windings or coils 44, 45, 46, the latter being respectively connected to output lines 47, 48, 49, and a neutral line 50.

The field winding 41 is connected by lines 51, 52, to a rotary exciter $E^3$ which supplies direct current thereto, and, in turn, has a field winding $f^3$ which is energized by a regulator $R^3$ having a conventional sensing circuit (not shown) which is connected by conductors $c^7$, $c^8$, $c^9$, to load lines $L^7$, $L^8$, $L^9$. The exciter $E^3$ and the regulator $R^3$ also are conventional in construction and, therefore, neither illustrated nor described in detail herein.

The regulator $R^3$ receives alternating current through three pairs of conductors $53^a$, $54^a$, $53^b$, $54^b$, and $53^c$, $54^c$, which are, in turn respectively connected to the three secondary windings $55^a$, $55^b$, $55^c$ of saturable transformers $56^a$, $56^b$, $56^c$, and rectifies such alternating current to provide a direct current supply to the field winding $f^3$ of the exciter $E^3$. The three saturable transformers $56^a$, $56^b$, $56^c$, are identical in electrical design and respectively include first primary windings $57^a$, $57^b$, $57^c$, which have small numbers of turns and are respectively in series between the line 47 and the load line $L^7$, the line 48 and the load line $L^8$, and the line 49 and the load line $L^9$. The transformers $56^a$, $56^b$, $56^c$, also include auxiliary primary windings $58^a$, $58^b$, $58^c$, each having a large number of turns and being respectively provided with terminals $t^7$, $t^8$, $t^9$, $t^{10}$, $t^{11}$, $t^{12}$, and $t^{13}$, $t^{14}$, $t^{15}$. The end terminals $t^8$, $t^{11}$, $t^{14}$, are connected in common to the neutral line 50. Connected across the pairs of end terminals $t^7$, $t^8$, $t^{10}$, $t^{11}$, and $t^{13}$, $t^{14}$, of the auxiliary primary windings $58^a$, $58^b$, $58^c$, respectively are capacitors $59^a$, $59^b$, $59^c$, which improve the wave-form and the voltage regulation of the output of transformers $56^a$, $56^b$, and $56^c$. A linear reactor $60^a$ is connected between the intermediate terminal $t^9$ on the auxiliary primary winding $58^a$ and the line 47. Similarly, a linear reactor $60^b$ is connected between the intermediate terminal $t^{12}$ and the line 48. Finally, a linear reactor $60^c$ is connected between the intermediate terminal $t^{15}$ and the line 49, all as best seen in FIG. 3. The linear reactors $60^a$, $60^b$, $60^c$, provide lagging power factor currents to the portion of the auxiliary primaries between terminals $t^8$, $t^9$, $t^{11}$, $t^{12}$, and $t^{14}$, $t^{15}$. These currents must be large enough to produce partial magnetic saturation in transformers $56^a$, $56^b$, $56^c$, and to supply to the exciter field winding $f^3$, via regulator $R^3$, sufficient power to cause nominal output voltage from the alternator $A^3$ under the condition of no current in the load lines $L^7$, $L^8$, $L^9$.

In use, the load lines $L^7$, $L^8$, $L^9$, are connected to the load $M^3$ and the alternator $A^3$ is driven by a suitable prime mover, such as a steam turbine or the like (not shown). The rotation of the field winding 41 will carry with it the lines of force which will pass across the armature coils 44, 45, 46, thereby inducing a voltage therein. The alternating current voltage which is produced in each of the windings 44, 45, 46, is conducted by the output lines 47, 48, 49, to the load lines $L^7$, $L^8$, $L^9$, and thence to the load $M^3$. When current flows through the primary windings $57^a$, $57^b$, $57^c$, voltages will be induced in the auxiliary primary windings $58^a$, $58^b$, $58^c$, and the secondary windings $55^a$, $55^b$, $55^c$, thereby supplying supplementary energy to the regulator $R^3$.

When the load $M^3$ suddenly increases, such as by the starting of a large electric motor, the voltages across the load lines $L^7$, $L^8$, $L^9$, suddenly drop. If, in such instance, the regulator $R^3$ were connected directly across the load lines $L^7$, $L^8$, $L^9$, as a source of its power, according to conventional practice, then such sudden and large decrease of voltage in the load lines $L^7$, $L^8$, $L^9$, would rather quickly be reflected in a corresponding reduction in the power output at the direct current side of the regulator $R^3$. However, as the load $M^3$ increases, the current within the load lines $L^7$, $L^8$, $L^9$, would tend to increase. This, of course, would tend to induce larger voltages within the windings $55^a$, $55^b$, $55^c$, $57^a$, $57^b$, $57^c$, and $58^a$, $58^b$, $58^c$, of the saturable transformers $56^a$, $56^b$, $56^c$, but the latter will saturate and thereby control such voltages and hold them to relatively constant levels. Thus, as the increased load $M^3$ places a corresponding demand for increased current upon the alternator $A^3$, the latter will, in turn, require more power from the exciter $E^3$ which accordingly draws more power from the D.C. side of the regulator $R^3$. The regulator $R^3$ responsively draws more current at relatively constant voltages from the secondaries $55^a$, $55^b$, $55^c$, and the latter thus become fully adequate and continuous sources of power for the exciter $E^3$. The use of three saturable transformers $56^a$, $56^b$, $56^c$, although obviously more expensive than the previously described embodiments, provides a more precise degree of control, can more readily accommodate to unbalanced loads across the several phases and also provides a greater reservoir of power for the exciter $E^3$ by providing a maximum availability of power from the secondary windings $55^a$, $55^b$, $55^c$.

Figure 4:
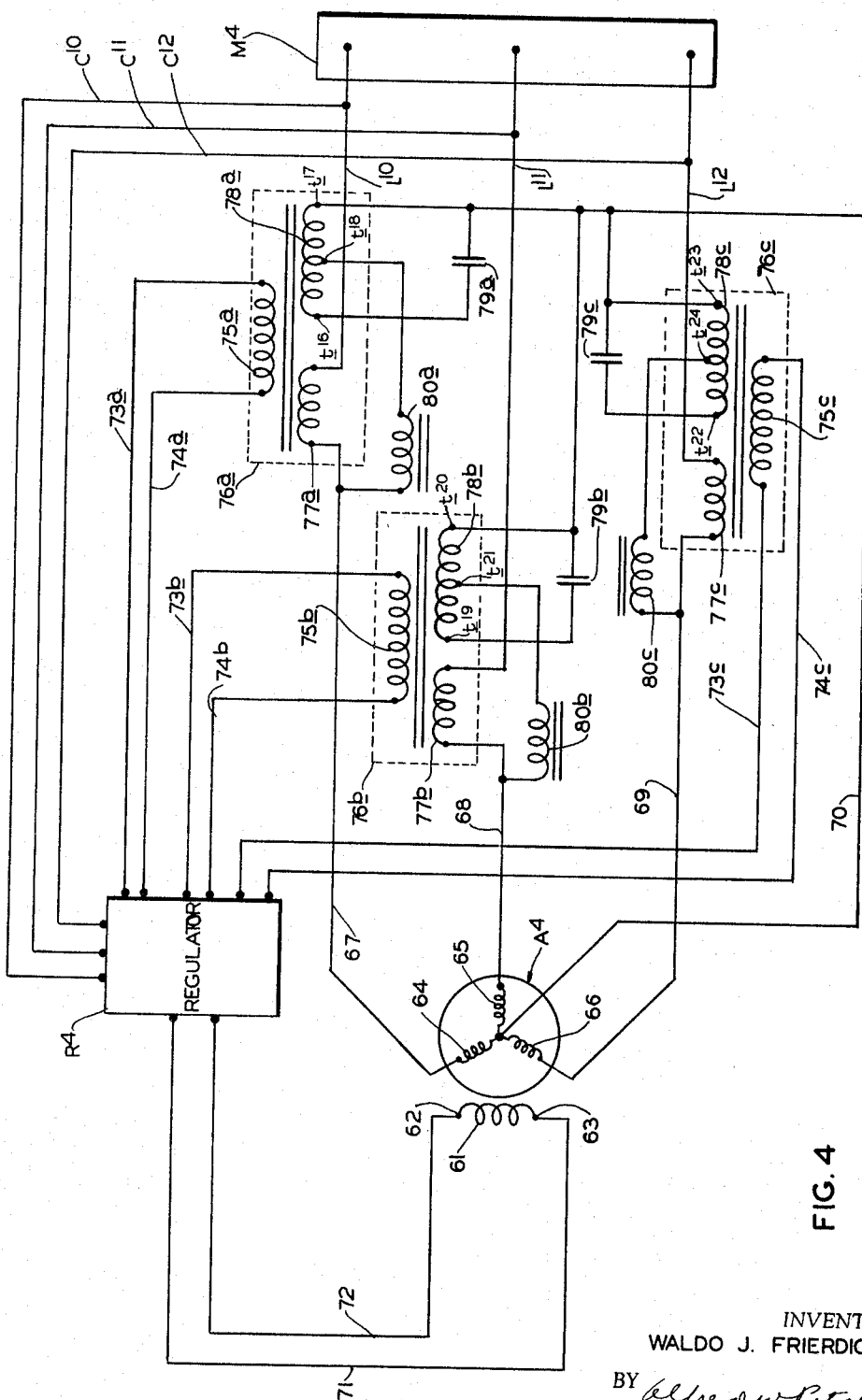
FIG. 4 is a schematic diagram of a third modified form of A.C. generator regulating system constructed in accordance with and embodying the present invention.

It is also possible to provide a fourth modified form of regulating system as shown in FIG. 4, which is substantially similar to the regulating system shown in FIG. 3 and is adapted for use with an alternator $A^4$ having a rotary field winding 61 provided with terminals 62, 63. The alternator $A^4$ also has three Y-connected stator windings or coils 64, 65, 66, which are respectively connected to output lines 67, 68, 69, and a neutral line 70. The operation and construction of the alternator $A^4$ is also conventional and is, therefor, not specifically illustrated or described herein.

The field winding 61 is connected by lines 71, 72, directly to a regulator $R^4$ having a conventional sensing circuit (not shown) which is connected by conductors $c^{10}$, $c^{11}$, $c^{12}$, to load lines $L^{10}$, $L^{11}$, $L^{12}$. The regulator $R^4$ is conventional in construction and, therefore, neither illustrated nor described in detail herein.

The regulator $R^4$ receives alternating current through three pairs of conductors $73^a$, $74^a$, $73^b$, $74^b$, and $73^c$, $74^c$, which are, in turn, respectively connected to three secondary windings $75^a$, $75^b$, $75^c$, of saturable transformers $76^a$, $76^b$, $76^c$, and rectifies such alternating current to provide a direct current supply to the field winding 61 of the alternator $A^4$. The transformers $76^a$, $76^b$, $76^c$, include primary windings $77^a$, $77^b$, $77^c$, which have small numbers of turns and are respectively connected in series between the lines 67, 68, 69, and the load lines $L^{10}$, $L^{11}$, $L^{12}$. The transformers $76^a$, $76^b$, $76^c$, also include auxiliary primary windings $78^a$, $78^b$, $78^c$, having large numbers of turns and being respectively provided with terminals $t^{16}$, $t^{17}$, $t^{18}$, $t^{19}$, $t^{20}$, $t^{21}$, $t^{22}$, $t^{23}$, $t^{24}$. The end terminals $t^{17}$, $t^{20}$ $t^{23}$, are connected in common to the neutral line 70. Connected across the end terminals $t^{16}$, $t^{17}$, $t^{19}$, $t^{20}$, and $t^{22}$, $t^{23}$, respectively, of the auxiliary primary windings $78^a$, $78^b$, 78c, are capacitors $79^a$, $79^b$, $79^c$, which improves the wave-form and the voltage regulation of the outputs of the transformers $76^a$, $76^b$, $76^c$. Linear reactors $80^a$, $80^b$, $80^c$, are respectively connected between the intermediate terminals $t^{18}$, $t^{21}$, $t^{24}$, and the lines 65, 68, 69, all as best seen in FIG. 4. The linear reactors $80^a$, $80^b$, $80^c$, provide lagging power factor currents to the portions of the auxiliary primaries respectively between intermediate terminals $t^{18}$, $t^{21}$, $t^{24}$, and end terminals $t^{17}$, $t^{20}$, $t^{23}$. These currents must be large enough to produce partial magnetic saturation in transformers $76^a$, $76^b$, $76^c$, and to supply to the alternator field winding 61, via the regulator $R^4$, sufficient power to cause nominal output voltage from the alternator $A^4$ under the condition of no current in the load lines $L^{10}$, $L^{11}$, and $L^{12}$.

In use, the load lines $L^{10}$, $L^{11}$, $L^{12}$, are connected to a load $M^4$ and the control circuit, as shown in FIG. 4, will function in all respects identically with the regulating system shown in FIG. 3, except that the exciter $E^3$ is eliminated and field excitation current is supplied to the field winding 61 directly from the regulator $R^4$.

Figure 5:
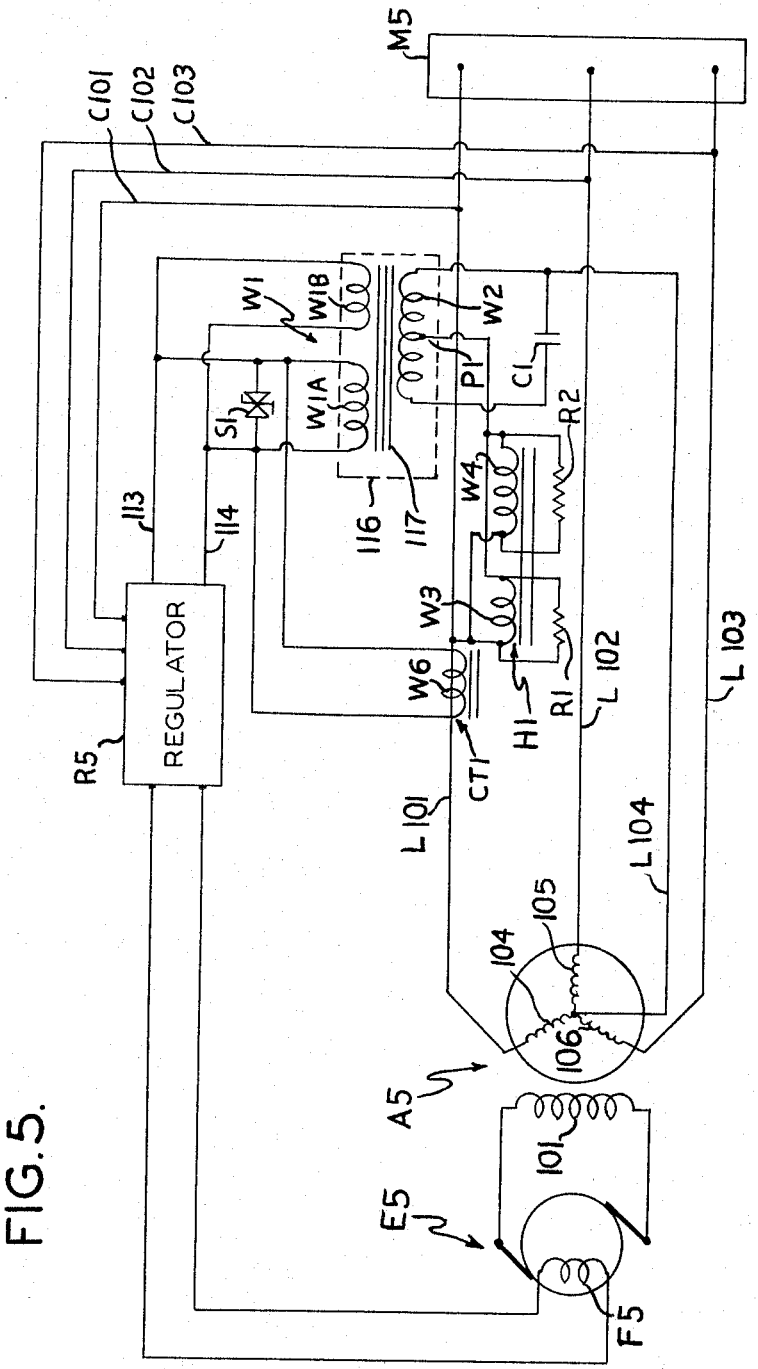
FIG. 5 is a schematic diagram of a fourth modified form of A.C. generator regulating system constructed in accordance with and embodying the present invention.

In the embodiments shown in FIGS. 1–4, a magnetizing force proportional to the load current is developed in the saturable transformer by means of a primary winding on the transformer core, which primary winding is directly connected in series with one of the conductors connecting the alternator to its load. It is also, however, possible to obtain a signal which varies as a function of load current by means of a current transformer which is coupled to one or more of the supply conductors. A regulating system employing such current responsive coupling is illustrated in FIG. 5. A three-phase Y connected alternator is indicated at $A^5$. Alternator $A^5$ includes a field winding 101 and generating windings 104, 105 and 106. Windings 104, 105 and 106 are connected, through respective supply conductors $L^{101}$, $L^{102}$ and $L^{103}$ to a three-phase load indicated at $M^5$. The common junction of windings 104, 105 and 106 is connected to a neutral conductor indicated at $L^{104}$.

Field winding 101 is supplied with direct current by a rotary exciter $E^5$ having a field winding $F^5$ which is in turn supplied with direct current from a regulator $R^5$. Regulator $R^5$ is responsive to the voltage between at least two of the conductors $L^{101}$, $L^{102}$ and $L^{103}$ and for this purpose includes a sensing circuit (not shown) which is connected by conductors $C^{101}$, $C^{102}$ and $C^{103}$ to load lines $L^{101}$, $L^{102}$ and $L^{103}$. Regulator $R^5$ modulates the D.C. current applied to field winding $F^5$ of exciter $E^5$ in conventional manner to maintain at a desired fixed level the voltage provided by alternator $A^5$ to load $M^5$.

Regulator $R^5$ is itself energized from alternator $A^5$ by means of a supply circuit incorporating a saturable reactor constituted by a saturable transformer 116. Transformer 116 includes a saturable magnetic core 117 and a pair of windings $W^1$ and $W^2$ which are inductively coupled to each other through core 117. Winding $W^1$ is constituted by a pair of winding sections $W^1A$ and $W^1B$ which are connected in parallel. For higher voltage applications these sections are connected in series. Winding $W^1$ is connected to regulator $R^5$ through a pair of leads 113 and 114 for supplying A.C. power thereto. Leads 113 and 114 are shunted by a suppressor $S^1$ which limits any high voltage transients which might otherwise damage components of regulator $R^5$.

Transformer 116 is energized in response to both the voltage and the current supplied by alternator $A^5$ to load $M^5$. Load line $L^{101}$ is connected to an intermediate tap $P^1$ on winding $W^2$ through a linear inductor $H^1$. Inductor $H^1$ includes a pair of similar windings $W^3$ and $W^4$ which are connected in parallel and which therefore function as a single unit. Windings $W^3$ and $W^4$ may, however, be connected in series for applications at higher voltages. Each of the widings $W^3$ and $W^4$ is shunted by a respective damping resistor $R^1$ and $R^2$.

One end of winding $W^2$ is connected to the neutral line $L^{104}$ and a capacitor $C^1$ is connected across the ends of the winding. Winding $W^2$ acts as an auto transformer which multiplies the effective capacitance of capacitor $C^1$ and places this multiplied capacitance in series with the inductor $H^1$ between lines $L^{101}$ and $L^{104}$. The effective multiplication is, however, dependent upon the magnetic conditions in core 117, the multiplication effect being degenerated as core 117 saturates. The values of inductor $H^1$ and capacitor $C^1$ are chosen so that the inductance and the multiplied value of capacitance are in series resonance at the generated A.C. frequency when the core 117 is substantially unsaturated. However, as core 117 becomes saturated, as by increased resonance currents, the series resonant circuit becomes detuned from the generated A.C. frequency. Accordingly, this circuit inherently limits or regulates the flux in core 117 and thus also regulates the voltage which appears across winding $W^1$.

A current transformer $CT^1$ is inductively coupled to the load line $L^{101}$ for sensing the flow of current therein. Current transformer $CT^1$ includes an output winding $W^6$ which is connected across winding $W^1$ of the saturable transformer 116 and is thus also connected to the lines 113 and 114 which supply power to regulator $R^5$. Current transformer $CT^1$ may optionally be coupled to more than one of the load lines so that even unbalanced loads will necessarily produce a substantial output voltage from winding $W^6$.

In operation under normal or light loads, power for regulator $R^5$ is obtained through transformer 116 from the voltage source which exists at line $L^{101}$ with respect to line $L^{104}$. The series resonant circuit described previously is excited by this voltage and the currents produced in winding $W^2$ apply an A.C. magnetizing force to core 117 which is a function of this voltage. A voltage is developed across the winding $W^1$, which voltage is regulated by the saturation of core 117 and the detuning of the series resonant circuit as described previously.

Under heavy load or short circuit conditions the voltage at line $L^{101}$ is typically insufficient to produce an adequate regulator supply voltage at winding $W^1$. Under these conditions, however, a heavy current flows through load line $L^{101}$ and the current transformer output winding $W^6$ provides power to the regulator supply lines 113 and 114. The voltage obtained from the current transformer $CT^1$ is applied also to the saturable transformer winding $W^1$ and thus an A.C. magnetizing force is applied to core 117, which force is a function of the current sensed by current transformer $CT^1$. The voltage which appears across lines 113 and 114 is thus effectively shunt-regulated by the saturable transformer 116 and the series resonant circuit coupled thereto.

Accordingly it may be seen that a sufficient supply of power is provided to regulator $R^5$ under the full range of load conditions from no load to short circuit and that the power supplied to the regulator $R^5$ is controlled under these various conditions so that a substantially constant voltage is developed across supply lines 113 and 114.

It should be understood that changes and modifications in the form, construction, arrangement, and combination of the several parts of the regulating systems for alternating current generators may be made and substituted for those herein shown and described without departing from the nature and principle of my invention.

What is claimed is:

1. A regulating system for an A.C. generator having a field winding and generating windings, said generating windings being electrically connectable through respective conductors to a load; said regulating system comprising:

regulator means connected to at least two of said conductors and being responsive to the voltage therebetween for applying a variable current to the field winding of said generator to maintain said voltage substantially at a fixed level;

a saturable reactor having a saturable magnetic core and output winding means on said core connected with said regulator means for supplying substantially constant voltage A.C. power thereto, said reactor including also a first power input winding interconnected with a pair of said conductors for applying to said core an A.C. magnetizing force which is a function of the voltage across said pair of said conductors; and means including a second power input winding for applying to said core an A.C. magnetizing force which is a function of the current in at least one of said conductors, saturation of said core being effective to substantially limit the A.C. voltage supplied to said regulator means to a preselected level whereby a substantially constant A.C. voltage is supplied to said regulator means by said reactor over a wide range of load currents.

2. A regulating system as set forth in claim 1 in which said means interconnected with said pair of conductors includes a capacitor connected in a tuned circuit, said circuit being substantially resonant at the generated A.C. frequency when said core is not substantially saturated and being detuned from said frequency as said core saturates thereby maintaining the voltage supplied by said reactor to said regulator means substantially at said preselected level.

3. A regulating system as set forth in claim 1 wherein said means for applying to said core an A.C. magnetizing force which is a function of the current in at least one of said conductors includes a winding on said core serially connected with said one conductor.

4. A regulating system for an A.C. generator having a field winding and generating windings, said generating windings being electrically connectable through respective conductors to a load; said regulating system comprising:
regulator means connected to at least two of said conductors and being responsive to the voltage therebetween for applying a variable current to the field winding of said generator to maintain said voltage substantially at a fixed level;
a saturable reactor having a saturable magnetic core and a winding on said core connected with said regulator means for supplying A.C. power thereto, said reactor including also means interconnected with a pair of said conductors for applying to said core an A.C. magnetizing force which is a function of the voltage across said pair of said conductors; and
means for applying to said core an A.C. magnetizing force which is a function of the current in at least one of said conductors including a current transformer inductively coupled to said one conductor, said current transformer having an output winding which is connected across a winding on said saturable reactor core, saturation of said core being effective to substantially limit the A.C. voltage supplied to said regulator means to a preselected level whereby a substantially constant A.C. voltage is supplied to said regulator means by said reactor over a wide range of load currents.

5. A regulating system as set forth in claim 4 in which said current transformer output winding is connected across the winding on said core which is connected to said regulator means.

6. A regulating system for an A.C. generator having a field winding and generating windings which are electrically connected through a plurality of conductors to the load; said regulating system comprising in combination means for supplying power to the field winding of said generator, said means including a regulator, saturable transformer means having at least one primary winding in series with at least one of said conductors, said transformer means having a secondary winding inductively coupled to said primary winding and being connected to the regulator for supplying power to the regulator, and means inductively coupled to said primary winding and being adapted to maintain substantially constant the voltage supplied to the regulator by said secondary winding thereby allowing adequate power delivery to said field winding irrespective of variations in load current.

7. A regulating system for A.C. generators according to claim 6 in which the saturable transformer means has an auxiliary primary winding, capacitor means operatively connected across said auxiliary primary winding, and a linear reactor connected between one end of the auxiliary primary and the conductor in which the first named primary winding is interposed, the other end of the auxiliary primary being connected to a different conductor.

8. A regulating system for supplying excitation current to the field winding of an A.C. generator, according to claim 6 in which the output of the regulator is connected directly to the field winding of the generator and further characterized by means in the regulator connected to the load lines for applying a corrective signal to said regulator, whereby the power supplied by the regulator to said field winding will vary responsive to variations in the magnitude of the load.

9. A regulating system for an A.C. generator system, the generator having generating windings connected through a plurality of conductors to the load and a field coil which obtains its power from a rotary exciter, the rotary exciter having a field winding; said regulating system comprising in combination means including a regulator the output of which is connected to the field winding of said exciter for supplying power thereto, saturable transformer means having at least one primary winding in series with at least one of said conductors, said transformer means having at least one secondary winding inductively coupled to said primary winding and being connected to the regulator for supplying power to the regulator, and means inductively coupled to said primary winding and being adapted to maintain substantially constant the voltage supplied to the regulator by said secondary winding, thereby allowing adequate power delivery to said field winding irrespective of variations in load current.

10. A regulating system for an A.C. generator having a field winding and generating windings which are electrically connected through a plurality of conductors to the load; said regulating system comprising in combination means including a regulator for supplying power to the field winding of said generator, power transference means inductively coupled to at least one of said conductors for supplying power to the regulator, said power transference means including at least one saturable transformer having two primaries and a secondary, one primary being interposed in series in one conductor, the other primary being inductively coupled to the first primary and connected to the said last-named conductor through a linear reactor and to a second line of the alternator, the secondary being connected to the regulator for supplying power thereto, and means operatively connected to said power transference means for improving the wave-form of its output voltage and to operate so as to hold such voltage substantially constant, thereby allowing adequate power delivery to said field windings irrespective of variations in load currents.

11. A regulating system for A.C. generators having a field winding, a plurality of generating windings, a neutral line, and a plurality of conductors electrically connecting said generating windings to load; said regulating system including exciter means electrically connected to the field winding of said generator for supplying power thereto, regulator means connected to the exciter means for supplying excitation current thereto, saturable transformer means operatively connected across at least one of said conductors, said transformer means including a main primary winding, an auxiliary primary winding, and a secondary winding, said main primary winding being interposed in series in said last-named conductor, said auxiliary primary winding being connected at one end to the neutral line and having an intermediate tap connected to a linear reactor which is in turn connected at its opposite terminal to said last-named conductor, a capacitor connected across the opposite ends of said auxiliary primary winding, said secondary winding being connected to the regulator means for supplying power thereto, whereby adequate power delivery will be maintained at said field winding irrespective of variations in the load.

12. A regulating system for A.C. generators having a field winding and a plurality of generating windings; a plurality of conductors electrically connecting each of said generating windings to a load, regulator means electrically connected directly to the field winding of said generator for supplying excitation current thereto, saturable transformer means operatively connected across at least one of said conductors, said saturable transformer means including a main primary winding, an auxiliary primary winding and a secondary winding, said secondary winding being connected to the regulator means for supplying power thereto, said main primary winding being interposed in series in said last-named conductor whereby a voltage will be induced in the secondary winding responsive to the flow of current in said conductor, and capacitor means operatively connected across said auxiliary primary winding, one end of the auxiliary primary winding being connected to said last-named conductor through a linear reactor, the other end of the auxiliary primary winding being connected to a particular winding of the generator so that the current in the auxiliary primary winding is substantially in phase with the current in the main primary winding when the generator is supplying a low-lagging power factor load current.

13. A regulating system for three-phase A.C. generators having a field winding, a plurality of generating windings and three load conductors electrically connecting said generating windings to a load, three-phase regulator means electrically connected directly to the field winding of said generator for supplying excitation current thereto, three saturable transformers, each of said transformers including a main primary winding, an auxiliary winding, and a secondary winding, each of the three main primary windings being respectively interposed in series with a different load conductor each secondary winding being inductively coupled to the main primary winding of its transformer whereby a voltage will be induced in the secondary winding responsive to the flow of current in said conductor said secondary windings each being respectively connected to a different phase of the regulator for supplying power thereto, each of said auxiliary windings being inductively coupled to the main primary winding of its transformer and being adapted for maintaining substantially constant voltage in the secondary winding thereof irrespective of fluctuations of the current in the load lines and capacitor means operatively connected across each auxiliary winding.

14. A regulating system for three-phase A.C. generators having a field winding, an exciter, a plurality of generating windings, and three load conductors; said regulating system comprising regulating means electrically connected to the exciter for supplying excitation current thereto, three saturable transformers, each of said transformers including a main primary winding, an auxiliary winding, and a secondary winding, each of the three main primary windings being respectively interposed in series with a different load conductor, each secondary winding being inductively coupled to the main primary winding of its transformer whereby a voltage will be induced in the secondary winding responsive to the flow of current in said conductor, said secondary windings each being respectively connected to a different phase of the regulator for supplying power thereto, each of said auxiliary windings being inductively coupled to the main primary winding of its transformer and being adapted for maintaining substantially constant voltage in the secondary winding thereof irrespective of fluctuations of the current in the load lines, and capacitor means operatively connected across each auxiliary winding.

15. A regulating system for A.C. generators having a field winding, an exciter, a plurality of generating windings, and a plurality of conductors electrically connecting said generating windings to a load; said regulating system including regulator means connected to the exciter for supplying excitation current thereto, saturable transformer means operatively connected across at least one of said conductors, said saturable transformer means including a main primary winding, an auxiliary primary winding, and a secondary winding, said secondary winding being connected to the regulator means for supplyng power thereto, said main primary winding being interposed in series in said last-named conductor whereby a voltage will be induced in the secondary winding responsive to the flow of current in said conductor, and capacitor means operatively connected across said auxiliary primary winding, one end of the auxiliary primary winding being connected to said last-named conductor through a linear reactor, the other end of the auxiliary primary winding being connected to a particular winding of the generator so that the current in the auxiliary primary winding is substantialy in phase with the current in the main primary winding when the generator is supplying a low-lagging power factor load current.

16. A regulating system for A.C. generators having a field winding, a plurality of generating windings, a neutral line, and a plurality of conductors electrically connecting said generating windings to a load; said regulating system including a regulator connected to the field winding for supplying current thereto, saturable transformer means operably connected across at least one of said conductors, said transformer means including a main primary winding, an auxiliary primary winding, and a secondary winding, said main primary winding being interposed in series in said last-named conductor, said auxiliary primary winding being connected at one end to the neutral line and having an intermediate tap connected to a linear reactor which is, in turn, connected at its opposite terminal to said last-named conductor, a capacitor connected across the opposite ends of said auxiliary primary winding, said secondary winding being connected to the regulator means and supplying power thereto, whereby adequate power delivery will be maintained at said field winding irrespective of variations in the load.

References Cited by the Examiner

UNITED STATES PATENTS 2,990,508    6/1961    Thompson _____ 322—25
3,244,967    4/1966    Tango et al. _____ 323—88 X

FOREIGN PATENTS 831,698    3/1960    Great Britain.

MILTON O. HIRSHFIELD, *Primary Examiner.*

J. J. SWARTZ, *Assistant Examiner.*